(12) United States Patent
Manolescu et al.

(10) Patent No.: US 8,483,669 B2
(45) Date of Patent: Jul. 9, 2013

(54) MOBILE SENSOR NETWORK

(75) Inventors: Dragos A. Manolescu, Kirkland, WA (US); Erik Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 12/418,145

(22) Filed: Apr. 3, 2009

(65) Prior Publication Data

US 2010/0255830 A1    Oct. 7, 2010

(51) Int. Cl.
*H04M 3/42* (2006.01)

(52) U.S. Cl.
USPC .................. 455/414.1; 455/456.1; 455/41.1; 455/41.2; 455/517; 455/67.11; 455/420; 455/68; 455/70

(58) Field of Classification Search
None
See application file for complete search history.

(56) References Cited

U.S. PATENT DOCUMENTS

| | | | |
|---|---|---|---|
| 7,020,494 | B2 | 3/2006 | Spriestersbach et al. |
| 7,321,774 | B1 * | 1/2008 | Lau et al. ................... 455/456.1 |
| 2006/0100921 | A1 | 5/2006 | Zanotti et al. |
| 2006/0279732 | A1 | 12/2006 | Wang et al. |
| 2008/0242265 | A1 | 10/2008 | Cohen et al. |
| 2008/0261572 | A1 | 10/2008 | Tsui et al. |
| 2008/0287144 | A1 | 11/2008 | Sabata et al. |

OTHER PUBLICATIONS

Fok et al., "Mobile Agent Middleware for Sensor Networks: An Application Case Study", Nov. 29, 2004, http://cse.seas.wustl.edu/techreportfiles/getreport.asp?399.
Breslin, et al. "Integrating Social Networks and Sensor Networks", Jan. 15-16, 2009, pp. 1-6, http://www.w3.org/2008/09/msnws/papers/sensors.html.
"Sensor Data Collection Using Heterogeneous Mobile Devices", Prem Prakash Jayaraman, Arkady Zaslavsky and Jerker Delsing, IEEE International Conference on Pervasive Services, Jul. 15-20, 2007, 4 pgs.
"Tricorder: A mobile sensor network browser", Joshua Lifton, Manas Mittal, Michael Lapinski and Joseph A. Paradiso, in proceedings of the ACM CHI 2007 Conference, Mobile Spatial Interaction Workshop, San Jose, CA, Apr. 28-May 7, 2007, 4 pgs.

* cited by examiner

*Primary Examiner* — Willie J Daniel, Jr.
(74) *Attorney, Agent, or Firm* — Microsoft Corporation

(57) ABSTRACT

A sensor network may be created by collecting information from a plurality of mobile devices, such as cellular telephones. The mobile devices use sensors, such as microphones, cameras, accelerometers, biometric readers, etc. to detect the sensory information. Sensory output related to detected sensory information may be transmitted from a mobile device to a receiver that receives the sensory outputs. The received sensory outputs from a plurality of mobile devices may be aggregated to generate aggregated data, which may be transmitted to one or more receivers that use the aggregated data to perform a function and/or present the aggregated data to a user. Additionally, the aggregated data may be reviewed by a reviewer component that can create (revised) detection instructions regarding how one or more mobile devices are to detect sensory information and/or what sensory information to detect (e.g., to make resulting aggregated data more relevant).

20 Claims, 6 Drawing Sheets

MOBILE SENSOR NETWORK

BACKGROUND

Mobile devices such as cellular telephones, global positioning systems, and laptop computers are becoming increasingly popular through the world, and manufactures of these devices are constantly releasing new and improved devices that push the limits of technology. Today, many of these devices include microphones, accelerometers, cameras, positioning sensors, biometric sensors, and other sensing elements that may collect information about a user and/or a user's surroundings. For example, a positioning (e.g., GPS) sensor may determine a person's geographical location. Information collected from the positioning sensor may be combined with mapping software that provides some geographical context (e.g., what streets or restaurants are nearby). While this information is useful, its availability and relevancy is limited to the user and those with whom they explicitly share it.

To provide information more relevant to a larger community of many users as well as increase the coverage area, sensor networks are often deployed. Sensor networks are typically configured to measure a specific aspect of the physical environmental. For example, a sensor network may be deployed to monitor traffic on major highways near a large city or to monitor temperature or acoustics in an industrial complex. These sensor networks are often comprised of a plurality of sensor nodes (e.g., comprising sensor(s), local storage, a processor, and transceiver), that are positioned in particular areas of interests and are stationary during the collection process (e.g., the sensor nodes do not move while information is collected). The sensor nodes are configured to periodically transmit data to a computing system that collects and aggregates the data from the plurality of strategically placed sensor nodes. The aggregated data may then be used to provide information relevant to the larger community (e.g., how bad rush hour traffic is, how hot the building is, etc.).

While sensor networks, such as the one described above, have proven effective, there are significant limitations to these sensor networks. For example, the sensor nodes are often fixed and/or tethered to the environment so they cannot be easily moved and/or repositioned once they are put into place. Additionally, the sensor nodes are typically configured for one-way communication and are configured to measure only a predefined matrix (e.g., speed, temperature, heart rate, etc.). Therefore, the sensor network is not adaptable to changing interests of the community.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for aggregating data from mobile devices to create a sensory network is provided herein. The mobile devices act as sensor nodes of the sensory network. Sensory information (e.g., sight, sound, speed, heart rate, etc.) is detected using one or more sensors on a mobile device (e.g., a laptop, cellular telephone, car, etc.) and sensory output is generated. This sensory output may be received by a collector and transmitted to an aggregator that aggregates sensory output from a plurality of mobile devices to generate aggregated data. The aggregated data may then be transmitted to a receiver that receives the aggregated data and is configured to present the aggregated data to a user and/or to use the aggregated data to perform a function (e.g., to determine whether to turn on a heating system, to determine whether to reroute a vehicle because of traffic on a particular road, etc.).

The aggregated data may also be reviewed (e.g., by a reviewer component) to improve the relevance of the information detected. For example, the reviewer component may instruct a device that is detecting sensory information in a first manner to begin detecting sensory information in a second manner. Additionally, the reviewer component may instruct a device that is not detecting information to begin detecting information. For example, if the aggregator does not have enough sensory outputs to aggregate, the reviewer component may instruct additional mobile devices to begin detecting information and transmitting the information to the collector. In this way, the reviewer component may alter the information the aggregator is aggregating.

The sensory nodes are mobile devices, allowing sensors to be positioned in places where sensor nodes are not normally positioned, as well as to move to the areas of interest, thus following people. In this way, information related to areas that traditionally do not have sensory nodes (e.g., residential roads where traffic sensors are rarely located) may be detected. Additionally, by using mobile devices that are already utilized by many people, such as cellular telephones, the sensory network may be cost effective to build and operate (relative to currently used sensory networks).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
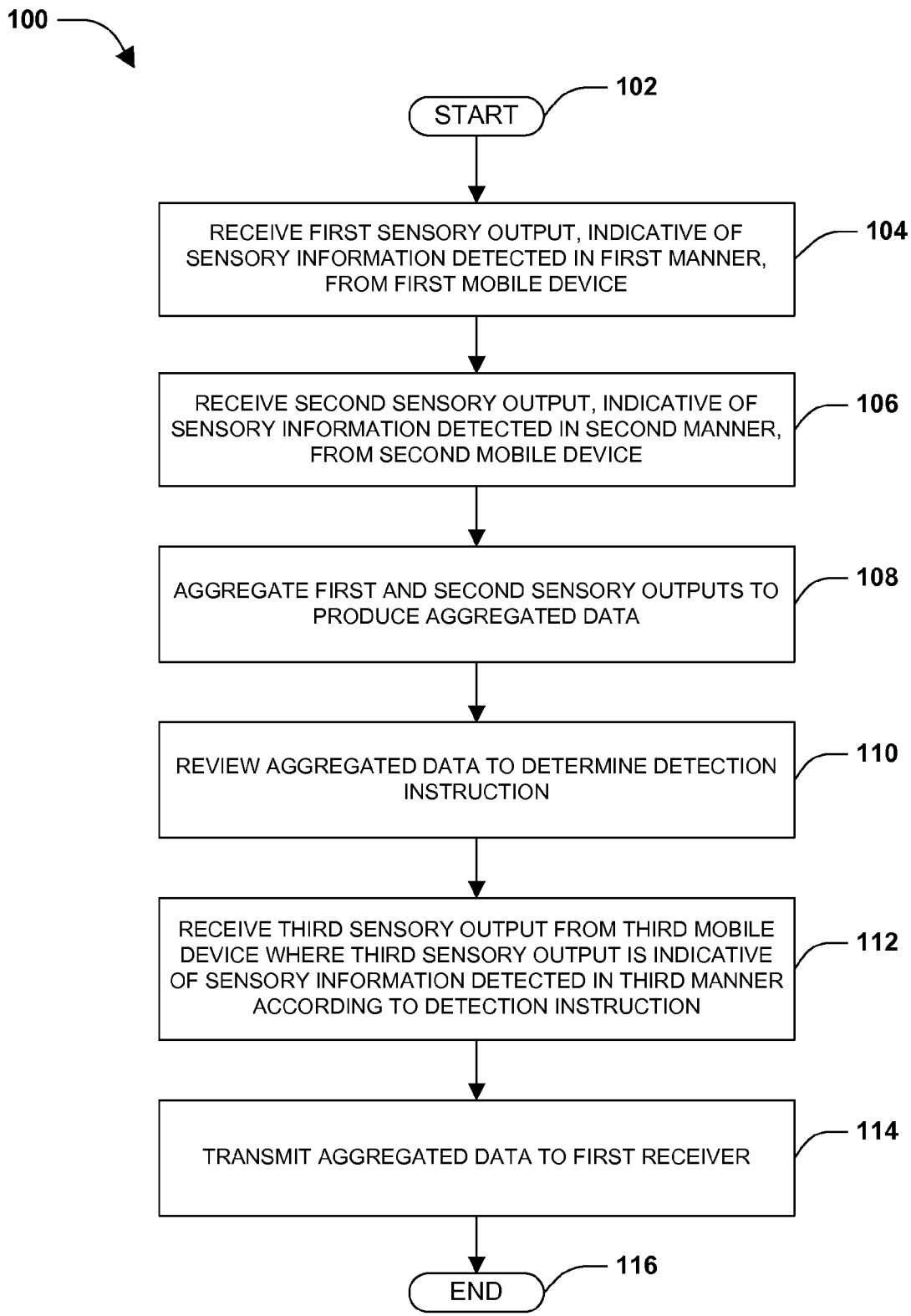
FIG. 1 is a flow chart illustrating an exemplary method of aggregating data.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

As provided herein mobile devices are used as nodes of a sensor network. Particular applicability is with regard to the use of cellular telephones, but other mobile devices may be used as well. Data related to sensory information detected from one or more sensors of the sensor nodes may be transmitted to a computing system that aggregates the data and generates aggregated data. The aggregated data may be transmitted to a receiver configured to present a portion of the aggregated data to a user and/or to perform a function based upon aggregated data. Additionally, the computing system may communicate with the sensor nodes, instructing the sensor nodes what information to collect or when to collect it, for example. A goal of such a network may be to provide a sensor network that is flexible, adaptable, and/or mobile.

FIG. 1 illustrates an exemplary method 100 for aggregating data. The method 100 begins at 102 and a first sensory output, indicative of sensory information detected in a first manner, is received from a first mobile device at 104. It will be appreciated that "mobile device" is used in a broad sense herein to describe a device that is easily moved from location to location. For example, devices that are easily lifted by a human and moved from location to location, such as handheld devices (e.g., cellular telephones, global positioning systems, laptop computers) may be considered mobile devices. Likewise, self-propelled vehicles may constitute a mobile device.

The mobile device may act similar to sensor nodes commonly used in sensor networks known to those skilled in the art. For example, the mobile device may comprise one or more sensors (e.g., accelerometers, cameras, microphones, biometric receivers, positioning receivers, temperature probes, etc.), a processor, and/or a transceiver. In this way, the mobile device may detect sensory information, such as the volume of a room, the temperature of a room, the speed a mobile device is traveling, etc. and generate sensory output. It will be understood and appreciated that mobile devices as referenced herein may also locally process or otherwise transform detected sensory information (e.g., perform signal processing, perform data computations, etc.), and that sensory output as referenced herein is intended to comprise such processed information. By way of example, a cellular telephone may perform signal processing, for example, on a noise level detected by a microphone of the mobile device, and may then transmit sensory output (e.g., datum) corresponding to this "treated" information. Accordingly, sensory output from a mobile device as provided herein also comprises information that may be (pre)processed in some manner by the mobile device. The generated sensory output may be transmitted (e.g., through an allowed wireless frequency) to a receiver. In one example, the mobile device is a cellular telephone and the sensory output is transmitted through a 3G or similar data connection to a cellular telephone transceiver.

The manner in which the sensory information is detected may vary depending upon the type of information being detected, the configurations of the mobile device, and/or the configurations of the sensor network. For example, the mobile device may be configured to detect sensory information at predefined intervals (e.g., every five minutes the sensor is activated for four seconds). In another example, the mobile device may be configured to detect sensory information with a first set of sensors during a first temporal interval and a second set of sensors during a second temporal interval. In this way, the information collected may vary based upon the time of day, the type of information that is relevant (e.g., traffic patterns during rush hour and/or restaurant crowds during a lunch break), etc.

There are numerous ways for determining when the sensory output may be transmitted from the mobile device to a computing system (e.g., configured to collect the transmitted data). For example, the mobile device may be configured to upload the sensory output at predetermined intervals (e.g., every five minutes). In another example, the output is transmitted based upon user endorsement and/or initialization (e.g., the user selects an upload icon on the mobile device). In yet another example, a notification, instructing the first mobile device when to transmit data, may be sent to the mobile device from the computing system. In this way, the computing system may collect sensory output when it is relevant (e.g., when few other mobile devices are transmitting similar sensory output to the computing system) and may not collect it when it is not relevant, saving the mobile device's resources (e.g., battery life) from unnecessary uploads. In one example, the notification instructs the first mobile device to determine information that is relevant when there is a substantial change in the sensory information being detected (e.g., the temperature drops by two degrees, the mobile device decelerates at a certain rate, such as by at least ten miles per hour while traveling on a highway, etc.). Stated differently, the notification (e.g., transmitted to the mobile device from the computing system) may instruct the mobile device to filter the sensory information being detected and generate sensory output related to less than all of the sensory information the mobile device detects. In this way, the sensors of the sensor network may be dynamically controlled (e.g., by the computing system).

For privacy and security purposes, an owner/user of a mobile device may place limitations on the sensory information that is detected/collected and/or the sensory output that is transmitted to the computing system. For example, where a notification is sent, the user may have to select or otherwise endorse the notification (e.g., displayed on the mobile device) before the first sensory output is transmitted to the computing system. Additionally, user specified parameters for detecting sensory information and/or transmitting sensory output may be set. For example, a user may create an instruction that has the mobile device automatically turn off the transceiver when the user is inside his/her home (e.g., based upon a GPS or other positioning receiver in the mobile device). The user may also control which sensors of the mobile device are usable by the sensor network. For example, a user may allow the sensory output to comprise sensory information detected by an accelerometer, but may not allow the sensory output to comprise sensory information detected by a microphone.

To provide an incentive for users to allow sensory information to be detected on their mobile device and/or transmitted to a receiver configured to receive sensory output, a service provider (e.g., the entity that manages the sensory network, the cellular telephone provider, etc.) may provide an incentive for collecting and uploading information. For example, the service provider may offer credits, refunds and/or raffles, etc. if certain mobile devices (e.g., that are in areas of interests) transmit information to the receiver. In this way, a user may be incentivized to permit sensory output to be transmitted to a receiver.

At 106, second sensory output, indicative of sensory information detected in a second manner, is received from a second mobile device. It will be appreciated that the second mobile device may be a mobile device configured similar to the first mobile device (e.g., they may both be cellular telephones) or they may be configured differently (e.g., the first device may be a cellular telephone and the second may be a laptop computer). Additionally, the second manner for detecting sensory information may be similar to the first manner. For example, the first and second devices may utilize similar sensors to detect sensory information and/or may detect sensory information for similar time intervals. Alternatively, the second manner may be different from the first manner. For example, the first mobile device may comprise different sensors than the second mobile device so the manner in which the information is collected may be different (e.g., the first mobile device may determine speed from an accelerometer and the second mobile device may determine speed based upon a rate of change according to its GPS).

It will be understood to those skilled in that art that the means by which the first and second sensory outputs are received may the different. For example, the first mobile device may utilize a 3G data connection to transmit data whereas the second mobile device may utilize an IEEE 802.11 protocol. Likewise, one and/or both of the first and second mobile devices may comprise local storage and the sensory output may be received by the receiver when the mobile devices are plugged into a fiber optic or other transmission line.

At 108, the first and second sensory outputs are aggregated to produce aggregated data, and the aggregated data is reviewed to determine a detection instruction at 110. A detection instruction is configured to instruct at least one mobile device to detect sensory information differently and/or to instruct a mobile device that has not detected particular sensory information to being detecting the particular sensory information. For example, the detection instruction may instruct a sensor of the mobile device to take a noise sampling every four minutes instead of every ten minutes. In another example, the detection instruction may instruct a device that is in a geographic location of interest (e.g., a remote area where few other mobile devices are located) to begin detecting the temperature.

The detection instruction may be transmitted to a third mobile device configured to receive the instruction. At 112, a third sensory output from the third mobile device is received. The third sensory output is indicative of sensory information detected in a third manner according to the detection instruction. That is, the detection instruction influences the manner in which sensory information is detected. For example, the detection instruction may instruct the mobile device how often to detect sensory information and/or what sensory information to collect. In this way, sensory information detected by the third mobile device may be customized based upon the current needs of the sensory network (e.g., the computing system may inform the third mobile device what sensors it should use to detect sensory information that would be more useful for the computing system).

It will be appreciated that the third mobile device and the first mobile device may be the same device. In this way, the detection instruction may provide feedback based upon the received first sensory output (e.g., creating two-way communication). For example, if the computing system determines that the first mobile device could provide additional relevant information based upon the information obtained from the first sensory output, the computing system may generate a detection instruction that instructs the first mobile device to use additional sensors to detect the additional relevant information. Alternatively, the detection instruction may instruct the first mobile device to continue detecting sensory information in the same manner (e.g., the first and third manners are the same).

It will be understood to those skilled in the art that two-way communication between the computing system (e.g., that aggregates sensory outputs) and mobile devices (e.g., that serve as sensor nodes) may be an improvement upon currently implemented, one-way communication, sensor networks. For example, with two-way communication, the information that is collected may change depending upon time of day, location of the mobile devices, etc. In this way, the sensory network may be flexible and the sensory information that is gathered may be adjusted according to the community's interests (e.g., dynamically controlling the sensors of the sensor network). For example, during a concert, the community may be interested in how crowded the concert arena is, so sensors that detect location may be turned on (e.g., to count the number of people). However, after the concert, the community may be more interested in how traffic is flowing, so the computing system may instruct sensors that detect speed to turn on.

At 114, the aggregated data is transmitted to a first receiver configured to use the aggregated data to perform a function and/or present a user with a trend, for example. In one embodiment, the first receiver is a desktop computer that controls a portion of the environment being monitored by the mobile devices. For example, the mobile devices may be located inside an industrial complex and may be configured to monitor temperature, and the aggregated data may be transmitted to a computer that controls the HVAC system of the industrial complex. In this way, the heating and cooling of a building may be controlled based upon sensors (e.g., cell phones sitting on desks) that are nearer people rather than by thermostats located in a fixed locations of the building.

At 116, the method ends.

Figure 2:
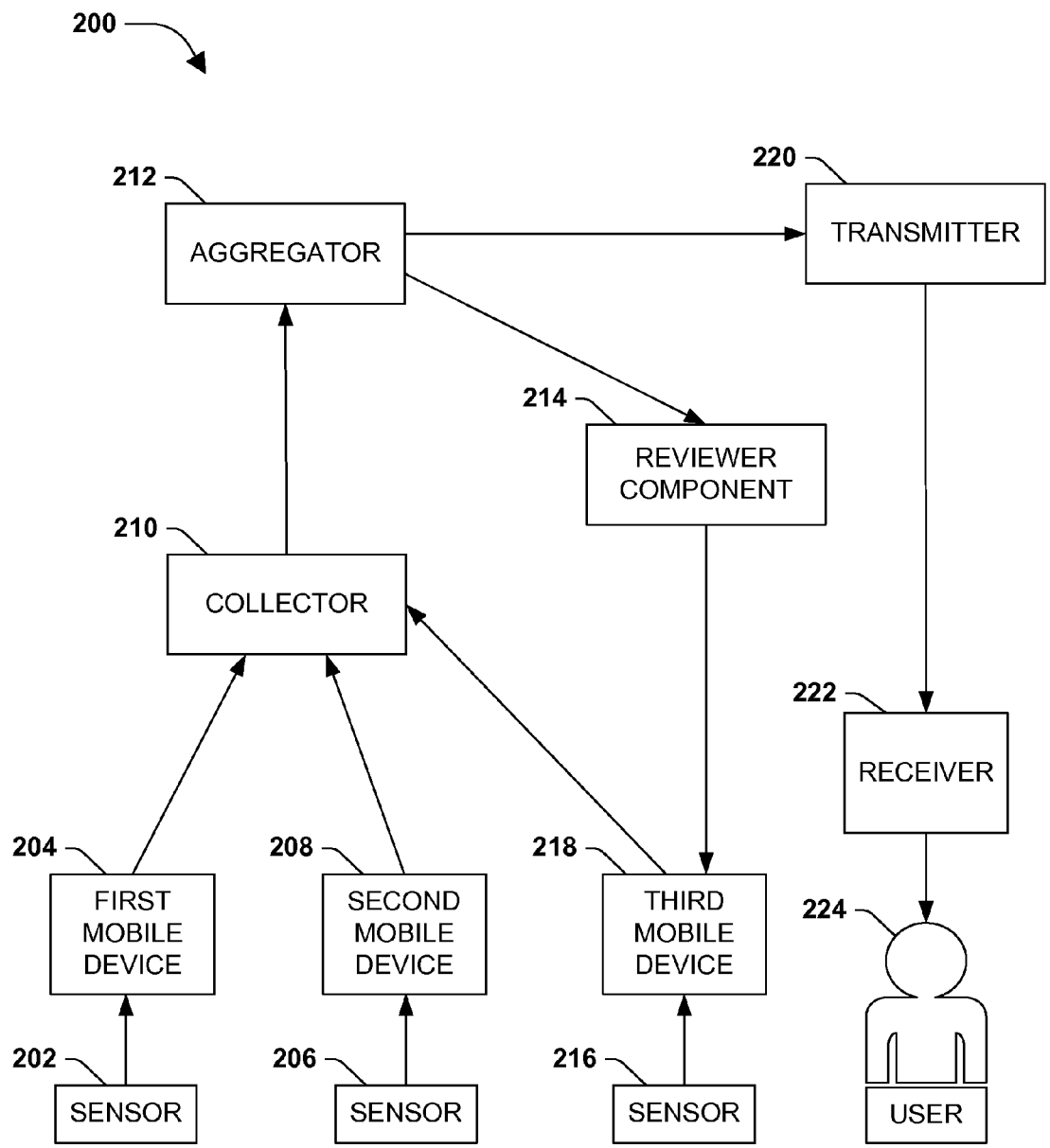
FIG. 2 is a component block diagram illustrating an exemplary system for aggregating data.

FIG. 2 illustrates a component block diagram illustrating an exemplary system 200 for aggregating data (using method 100 of FIG. 1). The exemplary system may be part of sensory network configured to collect sensory information and determine aspects of the environment (e.g., how crowded a place is, how busy the roads are, how cold it is at the top of the mountain, etc.).

The system 200 comprises a collector 210 configured to receive sensory outputs, indicative of detected sensory information, from at least a first 204 and a second 208 mobile devices. The mobile devices 204 and 208 detect sensory information from sensors 202 and 206 operably coupled to their respective mobile devices 204 and 208. From the sensory information detected, the mobile devices 204 and 208 may respectively generate sensory outputs. It will be appreciated that multiple sensors may be operably coupled to a single mobile device.

The mobile devices 204 and 208 generally comprise a transmitter configured to transmit their respective sensory outputs to the collector 210. For example, one or both of the mobile devices 204 and 208 may be a cellular telephone configured to transmit sensory output through a 3G data connection, or similar data connection, for example, to a cellular telephone tower The tower may, in turn, transmit the sensory outputs to the collector 210. Likewise, one or both of the mobile devices 204 and 208 may be laptop computers configured to transmit sensory output through an IEEE 802.11 protocol, for example. In another example, one or both of the mobile devices 204 and 208 comprise local storage and the sensory output is stored in the local storage until the mobile device(s) are connected to a fiber optic transmission line.

Once the collector 210 receives the sensory outputs, it is transmitted to an aggregator 212 that aggregates the received sensory outputs and generates aggregated data. The aggregator 212 is configured to aggregate the information according to a common characteristic of the sensory outputs from two or more mobile devices. For example, the aggregator 212 may be configured to aggregate, or rather group, sensory output related to mobile devices on a bus to determine how crowded a bus is, or how loud it is inside the bus. It will be understood to those skilled in the art that the larger the network of sensors, the more reliable the aggregated data may be. For example, aggregated data based upon the sensory outputs of two mobile devices may be less reliable for determining the sound level of a building than aggregated data based upon a cluster of (e.g., 50 or more) mobile devices.

It will be appreciated that the aggregator 212 may aggregate all or less than all of the information received from the at least two sensory outputs using techniques known to those skilled in the art. For example, the aggregator 212 may discard sensory output that is related to sensory information that is not relevant to the community. For example, if a mobile sensor is inside a car, sensory output related to the noise level inside the car may not be relevant to the community (e.g., because no one other than those inside the car likely care about how noisy the car is) so the aggregator may discard sensory output related to noise level.

The aggregator 212 may be configured to aggregate information according to predefined categories of interest and/or the aggregator may use learning techniques that train the aggregator to aggregate information according to the desired output. For example, people are more interested in a particular topic at certain times (e.g., based on search queries conducted on the internet), the aggregator 212 may determine that particular sensory information is more relevant, and accordingly, aggregate information into categories relevant to the topic.

It will also be appreciated that the aggregator 212 may be configured to aggregate information into user specific categories (e.g., the aggregator may aggregate the information according to a specific entity's request). For example, the owner of a building may request that the aggregator 212 aggregate sensory outputs from mobile devices in a first portion of a building to determine the temperature of the first portion building and aggregate sensory outputs from mobile devices in a second portion of the building to determine the acoustics of the second portion of the building. In this way, the owner of the building may use existing sensors (e.g., on the employees cellular phones) to cheaply determine how to make improvements on the building, for example.

The system 200 also comprises a reviewer component 214 operably coupled to the aggregator 212 and configured to review the aggregated data to determine a detection instruction that may be transmitted to a third mobile device 218. The detection instruction is configured to influence how the third mobile device 218 detects sensory information. For example, the detection instruction may instruct the third mobile device to detect sensory information every five minutes and/or the detection instruction may instruct the third mobile device what sensor(s) 216 to activate to collect particular sensory information.

Influenced by the detection instruction, the third mobile device 218 may detect sensory information using a sensor 216 and generate sensory output that may be transmitted to the collector 210. This sensory output may then be transmitted to the aggregator 212, wherein the aggregator 212 may reaggregate the sensory outputs and generate second aggregate data, for example.

The system 200 may also comprises a transmitter 220 operably coupled to the aggregator 212 and configured to transmit the aggregated data to a receiver 222. The receiver 222 may be a mobile device, such as the first 204, second 208, or third 218 mobile devices and/or it may be a more static device, such as a desktop computer, for example.

Aggregated data received by the receiver 222 may then be presented to a user in a user readable form and/or may be used to assist the receiver 222 in performing a function (e.g., determining whether to activate a heating unit). For example, the aggregated data may be used by the receiver 222 to provide a user 224 with information on how crowded a bus is so that the user 224 can decide whether to drive to work or ride the bus. Likewise, the user 224 may be a bus company and the company may use the information to adjust throughput (e.g., by dispatching additional buses). In another example, the receiver 222 may provide a city planner with information about which portions of the city's roads have significant traffic backups.

While much of the information the receiver 222 provides to the user may be acquired through the current sensor networks (e.g., that utilize static sensor nodes dedicated to detecting particular sensory information), it will be appreciated that the exemplary system 200 may be more flexible, provide more information, and may be cheaper to implement than current sensor networks. For example, unlike static networks that utilize static sensor nodes, the mobile devices may be easily moved from location to location (e.g., following a user). It will also be appreciated that the data from the mobile sensors may be combined with static sensors (e.g., of an existing sensory network) to provide information about areas where the cost of implementation of sensor nodes has been prohibitive. For example, data from mobile sensors may be combined with data from an existing traffic network to generate a comprehensive traffic map for highways and residential streets where traffic networks generally do not exist (e.g., because the cost of setting up sensor nodes on residential streets outweighs the benefits).

Figure 3:
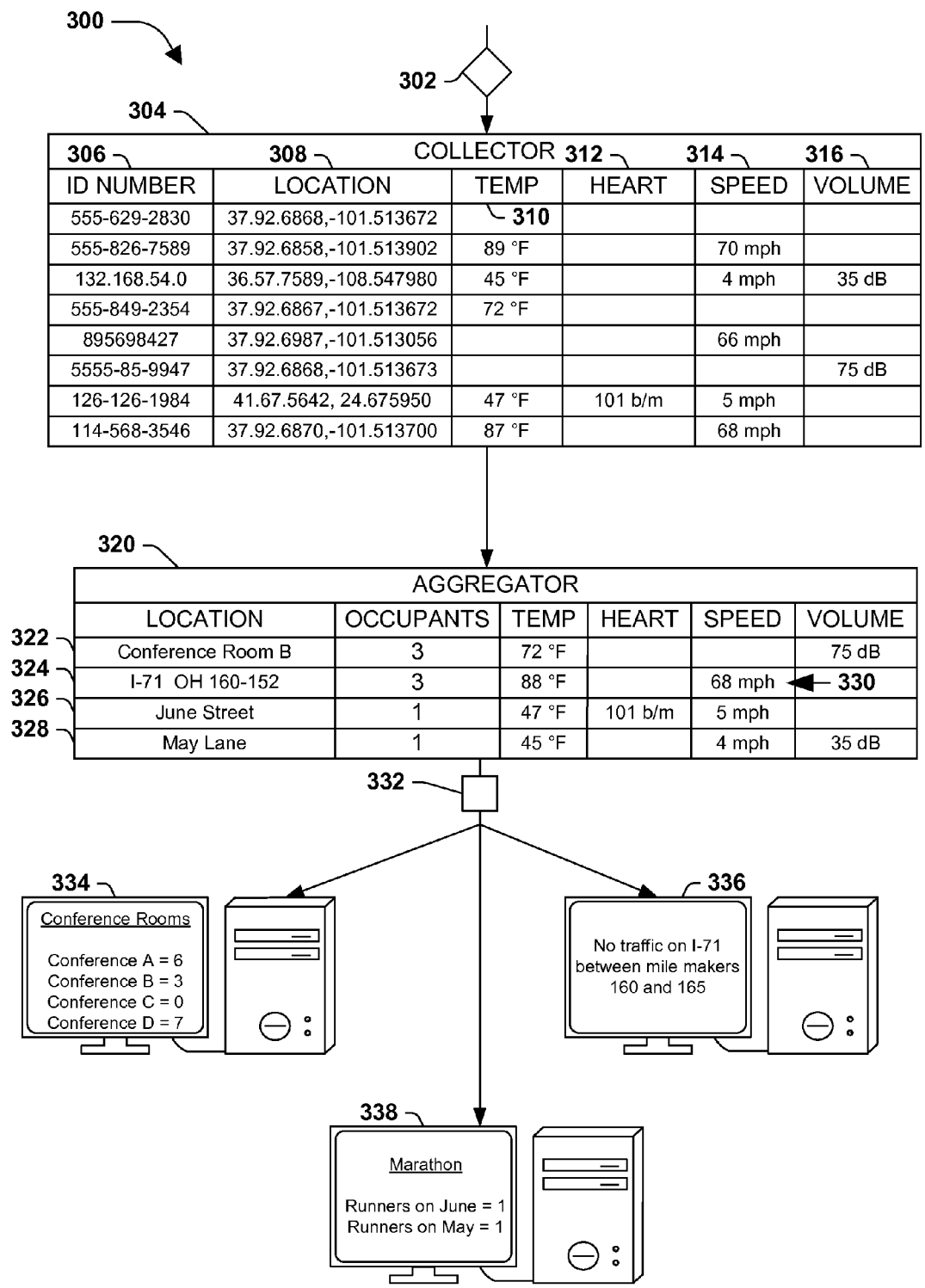
FIG. 3 is an exemplary system for receiving sensory outputs, aggregating the sensory outputs, and transmitting aggregated data to one or more receivers.

FIG. 3 illustrates components of a computing system 300 that may aggregate sensory outputs 302 of two or more mobile devices to generate aggregated data 332 indicative of trends. The collector 304 (e.g., 210 of FIG. 2) receives sensory outputs 302 from a plurality of mobile devices. In the illustrated example, sensory outputs 302 from eight mobile devices have been received. It will be appreciated that not all of the mobile devices need to be the same type of device. For example, some devices may be cell phones, while other devices are laptop computers, GPS devices, and/or vehicle sensors. In the illustrated example, respective devices are represented by an identification number 306 (e.g., telephone number, internet protocol address, etc.).

The data contained in the sensory outputs 302 may vary between mobile devices based upon the types of sensors on the mobile device, the privacy restrictions a user of the mobile device has implemented, etc. In the illustrated example, the sensory outputs relate to location 308, temperature 310, heart rate 312, speed 314, and the volume 316, or rather acoustics of a room. It will be appreciated that the example list of information is not intended to be limiting and those skilled in the art will understand that other sensor information may be collected.

The received sensory output may be transmitted to an aggregator 320 (e.g., 212 in FIG. 2) that aggregates the information, using techniques known to those skilled in the art, and generates aggregated data 332. In the illustrated example, the aggregator 320 first correlates data related to the mobile devices' respective locations with mapping software to determine where the mobile devices are located. In the example, three of the mobile devices are located in Jones' Conference Room B 322, three are located on I-71 in Ohio between mile markers one hundred sixty and one hundred sixty-five 324, one is located on June Street 326, and one is located on May Lane 328. Once the mobile sensors location has been determined, the other data may be aggregated accordingly. For example, the speeds various mobile sensors on I-71 are traveling (e.g., 70, 65, and 66 respectively) may be averaged to determine an average speed 330 (e.g., 68 mph) of travel.

The aggregated data 332 may be transmitted to one or more receivers 334, 336, 338. The receiver may be configured to present at least a portion of the aggregated data in user-presentable form to a user. It will be appreciated that less than all of the aggregated information may be transmitted to a receiver 334, 336, 338. In one example, aggregated data related to a first data set is transmitted to a first receiver and aggregated data related to a second data set, different than the first data set, is transmitted to a second receiver. For example, the aggregated data related to Jones' Conference Room B 322 may be transmitted to a receiver 334 (e.g., a computer) owned by Jones that displays how many people are in the company's various conference rooms. In this way, the company can relatively easily determine whether the conference rooms are being utilized efficiently. Another receiver 336 may receive information related to traffic on I-71 so that alternative routes may be planned if cars are moving slow on I-71, for example. In the illustrated example, another receiver 338 tracks the progress of runners during a marathon and may monitor heart rate, speed, and other information that may be important to the marathon organizers. It will also be appreciated that while the illustrated receivers 324, 336, 338 appear static (e.g., like desktop computers), one or more of the receivers may be a mobile device.

Figure 4:
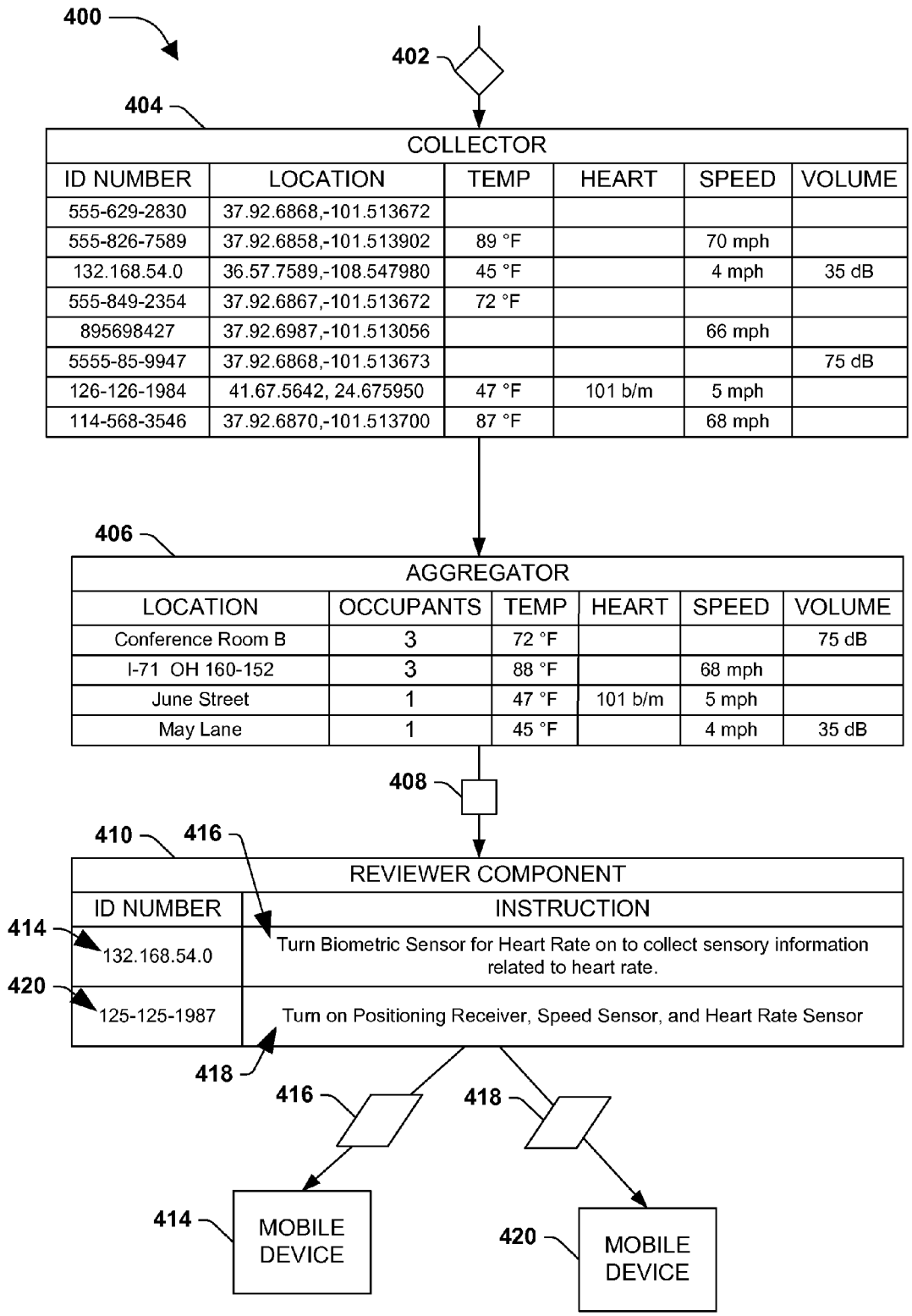
FIG. 4 is an exemplary system for receiving sensory outputs, aggregating the sensory outputs, reviewing aggregated data, and transmitting one or more detection instructions to one or more mobile devices.

FIG. 4 illustrates components of a computing system 400 that may aggregate sensory outputs 402 of two or more mobile devices, generate aggregate data 408, and create a detection instruction 412 that assist the computing system 400 in collecting additional sensory outputs.

The system comprises a collector 404 (e.g., 304 in FIG. 3) that receives sensory outputs (e.g., related to detected sensory information) from a plurality of mobile devices. Sensory outputs received by the collector 404 are transmitted to an aggregator 406 that may aggregate the information based upon some predefined rules and/or learned categories (e.g., as described with respect to FIG. 3), for example.

Once the sensory outputs are aggregated, the aggregator 406 may generate aggregated data 408 (e.g., 332 in FIG. 3) that may be transferred to a receiver (e.g., as illustrated in FIG. 3) and/or a reviewer component 410 that reviews the aggregated data 408 and generates a detection instruction 416, 418. The detection instruction 416, 418 may instruct a mobile device that has already transmitted sensory information to the collector 404 to detect sensory information in a different manner, and/or the detection instruction 416, 418 may instruct a mobile device that has previously not detected sensory information (e.g., and transmitted sensory output to the collector 404). In this way, the aggregated data may be more relevant to the people and/or entities that are ultimately going to view and/or use the aggregated data 408.

In the illustrated example, the reviewer component 410 creates a detection instruction 416 for a first mobile device 414 to detect sensory information related to a user's heart rate by turning on an additional sensor in the first mobile device 414. In this way, the aggregator 406 may collect more information about the first mobile device 414, and/or a user of the first mobile device 414 (e.g., besides sensory output related to the temperature, speed, and volume, all of which had previously been received).

The reviewer component 410 may also create a detection instruction 418 for a device 420 that had previously not detected sensory information, or rather transmitted sensor information to the collector 404. For example, during a marathon, an entity (e.g., viewing aggregated data transmitted to a receiver) may instruct the reviewer component 410 to detect sensory information from a mobile device 420 that had previously not detected sensory information, or rather failed to transmit sensory information to the collector 304. In the illustrated example, the reviewer component 410 generates a detection instruction 418 that instructs the mobile device 420 to turn on a positioning receiver, a speed sensor, and a heart rate sensor. In this way, the reviewer component 410 may customize who and/or what information is collected based upon the desires of an entity that is viewing and/or using the aggregated data 408.

Figure 5:
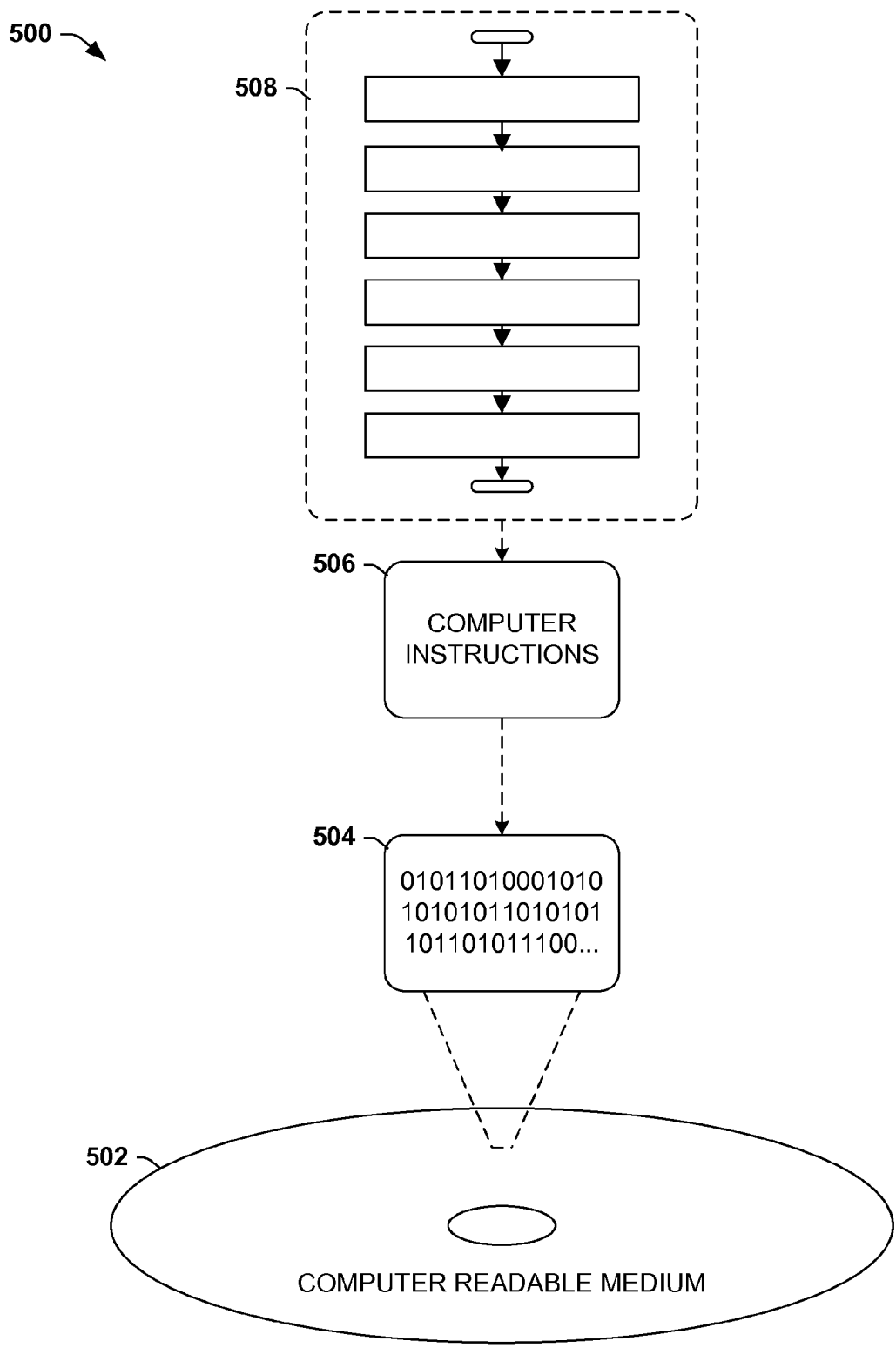
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to one or more of the principles set forth herein. In one such embodiment 500, the processor-executable instructions 506 may be configured to perform a method 508, such as the exemplary method 1 of FIG. 1, for example. In another such embodiment, the processor-executable instructions 506 may be configured to implement a system, such as the exemplary system 2 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
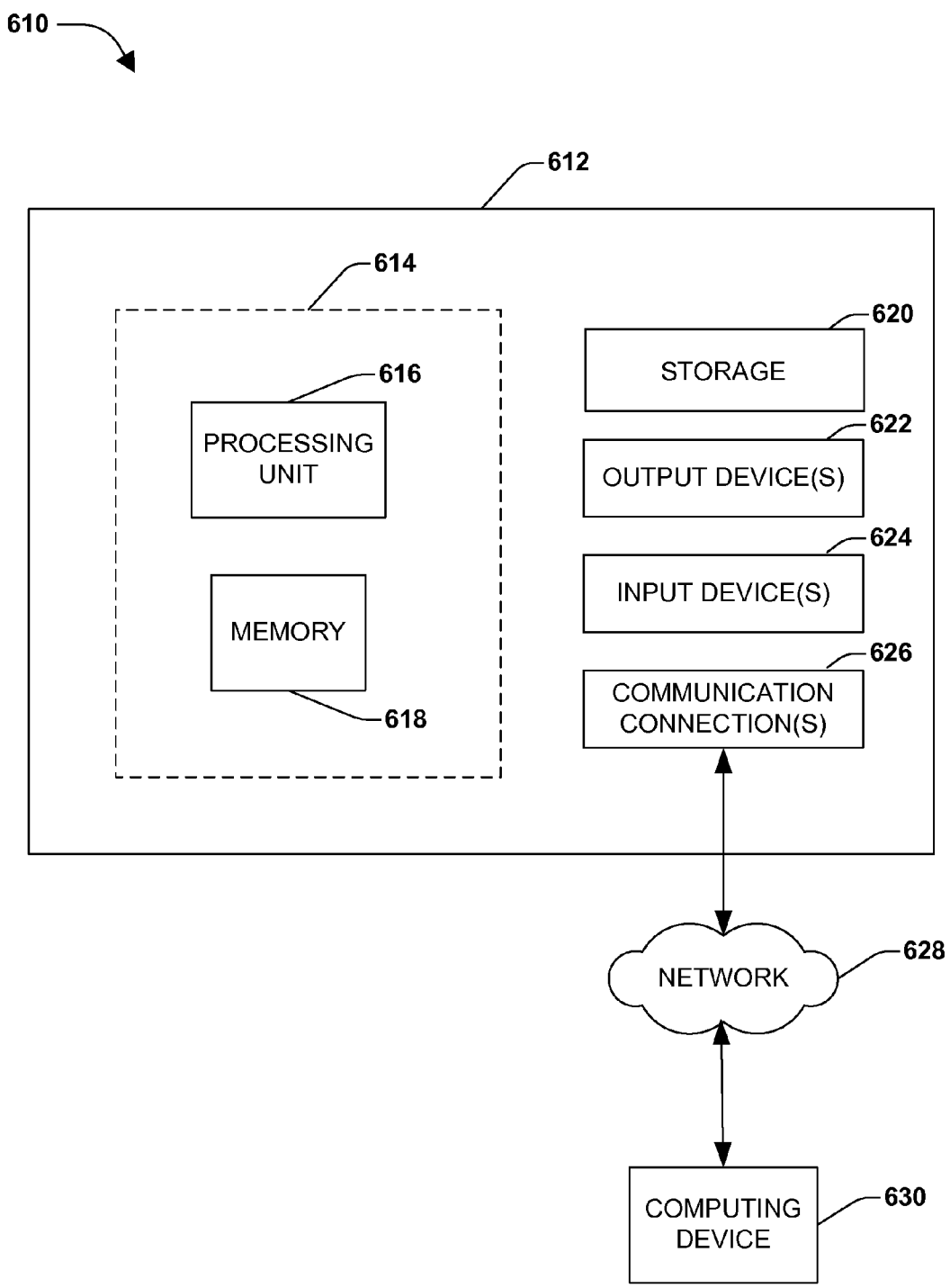
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for aggregating data, comprising:
receiving first sensory output from a first mobile device;
receiving second sensory output from a second mobile device;
aggregating the first and second sensory outputs to produce aggregated data;
reviewing the aggregated data to identify a deficiency in information represented by the aggregated data;
generating a detection instruction based upon the identified deficiency, the detection instruction configured to cause supplemental information to be acquired to reduce the deficiency in the information; and
receiving third sensory output from a third mobile device, the third sensory output indicative of sensory information detected according to the detection instruction.

2. The method of claim 1, the first and second mobile devices comprising sensor nodes, respective sensor nodes comprising at least one of:
an accelerometer;
a camera; and
a biometric receiver.

3. The method of claim 1, the first and second mobile devices comprising cellular telephones.

4. The method of claim 1, the aggregated data indicative of first and second data sets, the first data set indicative of a first environmental condition and the second data set indicative of a second environmental condition.

5. The method of claim 1, comprising sending a notification to the first mobile device, the notification configured to instruct the first mobile device to transmit the first sensory output.

6. The method of claim 5, comprising presenting the notification on the first mobile device.

7. The method of claim 5, the first sensory output received based at least in part upon an endorsement of the notification.

8. The method of claim 5, the notification configured to instruct the first mobile device to transmit the first sensory output when there is a substantial change in sensory information detected by the first mobile device.

9. The method of claim 1, comprising offering an incentive to transmit the first sensory output, the incentive comprising a credit to encourage a user to allow the first sensory output to be transmitted.

10. The method of claim 1, comprising:
supplementing the aggregated data with the third sensory output; and
transmitting the supplemented aggregated data to a first receiver comprised within at least one of the first, second, and third mobile devices.

11. The method of claim 1, the first mobile device and the third mobile device being the same mobile device.

12. The method of claim 1, comprising supplementing the aggregated data with the third sensory output.

13. The method of claim 1, comprising transmitting the detection instruction to the third mobile device.

14. The method of claim 1, aggregating the first and second sensory outputs comprising aggregating the first and second sensory outputs according to topics of interest, where topics of interest are determined based upon searches performed via a search engine.

15. An apparatus for aggregating data, comprising:
a collector configured to receive sensor outputs, indicative of detected sensory information, from first and second mobile devices;
an aggregator configured to aggregate the received sensor outputs and generate aggregated data; and
a reviewer component configured to review the aggregated data to identify a deficiency in information represented by the aggregated data and generate a detection instruction based upon the identified deficiency, the detection instruction transmitted to a third mobile device and configured to cause supplemental information to be acquired to reduce the deficiency in the information.

16. The apparatus of claim 15, comprising a notification component configured to send a notification to at least one of the first mobile device and the third mobile device, the notification configured to instruct the at least one of the first mobile device and the third mobile device to transmit sensory output to the collector.

17. The apparatus of claim 16, the notification configured to at least one of:
instruct the first mobile device to transmit the sensory output to the collector when the first mobile device is in an area of interest; and
instruct the third mobile device to transmit the sensory output to the collector when the third mobile device is in an area of interest.

18. The apparatus of claim 16, the notification configured to instruct the first mobile device to transmit the sensory output to the collector when there is a substantial change in the sensory information detected by the first mobile device.

19. The apparatus of claim 15, the first and second mobile devices comprising handheld devices.

20. A computer readable storage device comprising computer-executable instructions that when executed via a processor perform a method, comprising:
receiving first sensory output from a first mobile device;
receiving second sensory output from a second mobile device;
aggregating the first and second sensory outputs to produce aggregated data;
reviewing the aggregated data to identify a deficiency in information represented by the aggregated data;

generating a detection instruction based upon the identified deficiency, the detection instruction configured to cause supplemental information to be acquired to reduce the deficiency in the information; and receiving third sensory output from a third mobile device, the third sensory output indicative of sensory information detected according to the detection instruction.

* * * * *